United States Patent [19]

Maury et al.

[11] Patent Number: 4,777,607
[45] Date of Patent: Oct. 11, 1988

[54] INTERFACE DEVICE FOR CONTROL AND MONITORING OF DISTRIBUTION PANELBOARDS

[75] Inventors: Georges Maury, Verrieres le Buisson; Georges Menou, Sevran, both of France

[73] Assignee: Spie Batignolles, Puteaux, France

[21] Appl. No.: 845,266

[22] PCT Filed: May 15, 1985

[86] PCT No.: PCT/FR85/00117
§ 371 Date: Jan. 10, 1986
§ 102(e) Date: Jan. 10, 1986

[87] PCT Pub. No.: WO85/05505
PCT Pub. Date: Dec. 5, 1985

[30] Foreign Application Priority Data

May 17, 1984 [FR] France .................................. 8407647

[51] Int. Cl.⁴ .............................................. H02B 1/02
[52] U.S. Cl. ..................................... 364/492; 307/86; 361/334; 361/346
[58] Field of Search .................................. 364/492-495, 364/481, 483, 484, 550; 307/85-87; 340/657; 361/331, 332, 334, 346, 350

[56] References Cited

U.S. PATENT DOCUMENTS 3,842,249 10/1974 Geyer et al. ................ 235/151.21
4,216,528 8/1980 Robertson ............................ 364/300
4,389,706 6/1983 Gomola et al. ...................... 364/492

FOREIGN PATENT DOCUMENTS

WO81/01350 5/1981 PCT Int'l Appl. .

OTHER PUBLICATIONS

"Becos 30 Software System for Large Dispatching Centres", Brown *Boveri Review*, vol. 66, by R. Frost et al., Mar. 1979, pp. 188-196.
"Le Materiel et le Logiciel des Bureaux Centraux de Conduite d'E.D.F.", *Revue Generale De L'Electricite*, vol. 85, No. 1, by J. Darmon et al., Jan. 1976, pp. 46-51.

*Primary Examiner*—Parshotam S. Lall
*Assistant Examiner*—Brian M. Mattson
*Attorney, Agent, or Firm*—Young & Thompson

[57] ABSTRACT

The electronic interface device permits remote control and monitoring of a power distribution panelboard coupled with a management system. In respect of each outgoing power line, a local control unit is connected to a remote control unit while a central unit is assigned to each local control unit to the remote control unit which then converts the data delivered by the local control unit into data which are compatible with the central unit. Exchange of data between each remote control unit and the management system is achieved by at least one microprocessor-based control circuit located in the central unit, through a series link or current loop.

8 Claims, 10 Drawing Sheets

FIG_3

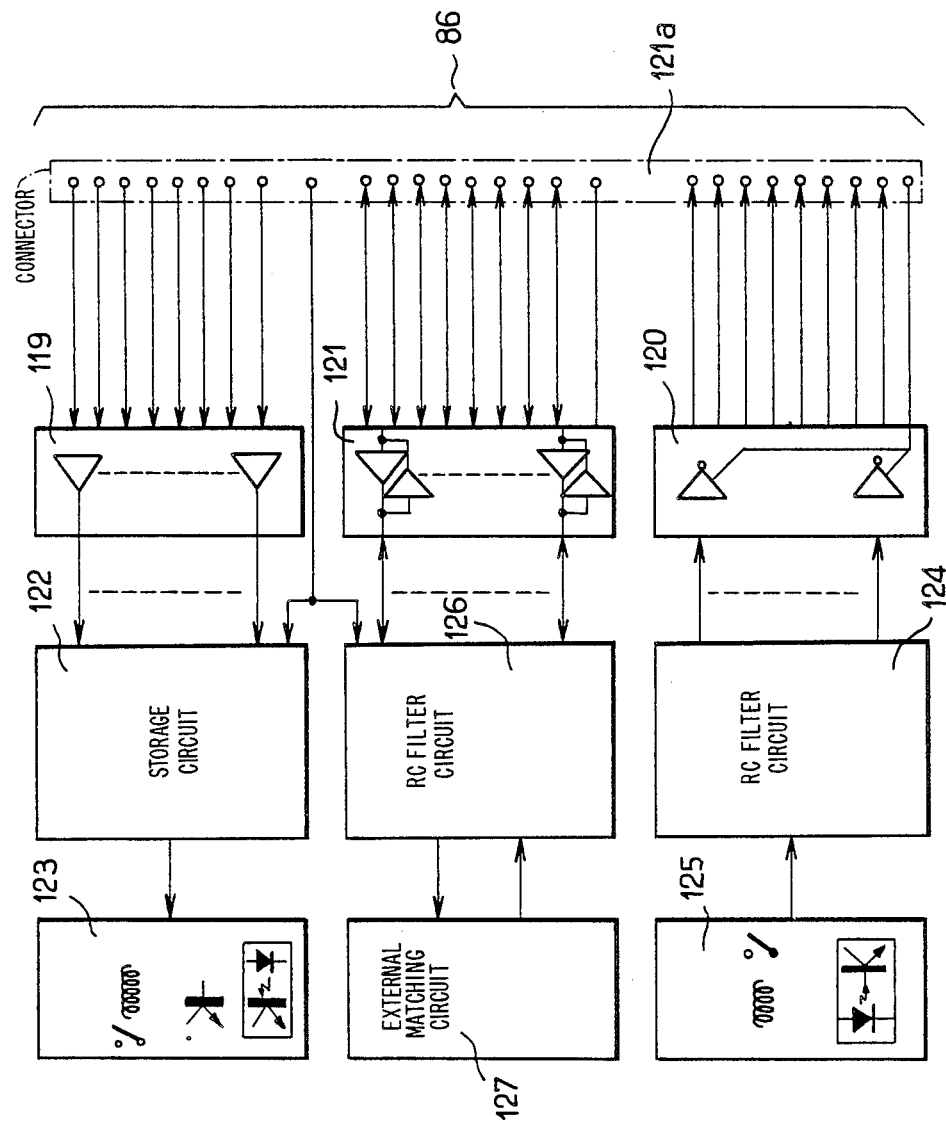

INTERFACE DEVICE FOR CONTROL AND MONITORING OF DISTRIBUTION PANELBOARDS

The present invention relates to an electronic interface device for remote control and monitoring of a power distribution panelboard coupled with a management system.

This device is primarily but not exclusively applicable to panelboards referred to as low-voltage draw-out panelboards comprising several power distribution assemblies each provided with a plurality of out-going power lines.

In the known technique, these power distribution panelboards are coupled with the management system such as a centralized management unit, a computer, a calculator, a programmable automatic control unit or the like by means of a large number of electric conductors.

The aim of the present invention is to simplify the installation of these known devices by considerably limiting the number of electric conductors which serve to interconnect the panelboards and the management system, thereby achieving enhanced reliability of these devices.

In accordance with the invention, the electronic interface device for remote control and monitoring of a power distribution panelboard coupled with a management system and comprising a plurality of power distribution assemblies each having a plurality of outgoing power lines is characterized in that it comprises:

in respect of each outgoing power line, a local control unit connected to a remote control unit;

a central unit in respect of each distribution assembly;

that each local control unit comprises means for addressing "on/off" signaling and control data to the remote control unit;

that each remote control unit comprises a microprocessor for converting the "on/off" data supplied by the local control unit into data which are compatible with the central unit;

that each remote control unit is connected to the central unit by means of a standardized link of the four-conductor series bus type and that the central unit is provided with at least one basic control circuit comprising a microprocessor for data exchange between each remote control unit and the management system by means of a standardized four-conductor series link or current loop.

In this device, the local control unit addresses on/off signaling and/or control data to the remote control unit and this latter converts these data into data which are compatible with the central unit, said central unit being linked with the external management system by means of a standardized four-conductor series link or current loop.

The link just mentioned thus replaces the multiplicity of conductors employed in known devices and therefore makes it possible to achieve considerable simplification of the electric wiring as well as enhanced safety and reliability of operation of the device.

In an advantageous embodiment of the invention, the basic control circuit is also connected by means of a standardized four-conductor link to a remote diagnostic testing and maintenance equipment unit for directly addressing data to said control unit.

Preferably, the central unit comprises a second control circuit connected to a second management unit by means of a standardized four-conductor series link, a third control circuit connected by means of a standardized four-conductor link, to a printer and a keyboard with display screen for recording the states of the device and introducing data, a circuit having analog inputs and connected to the microprocessor of the basic circuit by means of a parallel bus for measuring parameters such as power, current intensity and frequency, and a circuit having analog outputs for transmitting analog data by means of a standardized link to remote equipment such as instruments for measuring the parameters aforesaid, and circuits for managing with respect to each other the "on/off" data processed by the central control unit, each of these circuits being provided with a plurality of "on/off" inputs and outputs connected to external sensors or actuators.

In a preferred embodiment of the invention, each remote control unit comprises means for converting the "on/off" data received from the local control unit into eight-character messages and the local control unit comprises a basic local signaling circuit, an extension local signaling circuit, a basic local signaling and control circuit, an extension local signaling and control circuit and different local signaling-control circuits for local control of the power equipments of the panelboard in conjunction with the circuits aforementioned.

Other features and advantages of the invention will be further apparent from the description given hereinafter.

In the accompanying drawings which are given by way of non-limitative example:

FIG. 10 is a diagram of a circuit for managing with respect to each other the data processed by the local control unit.

Figure 1:
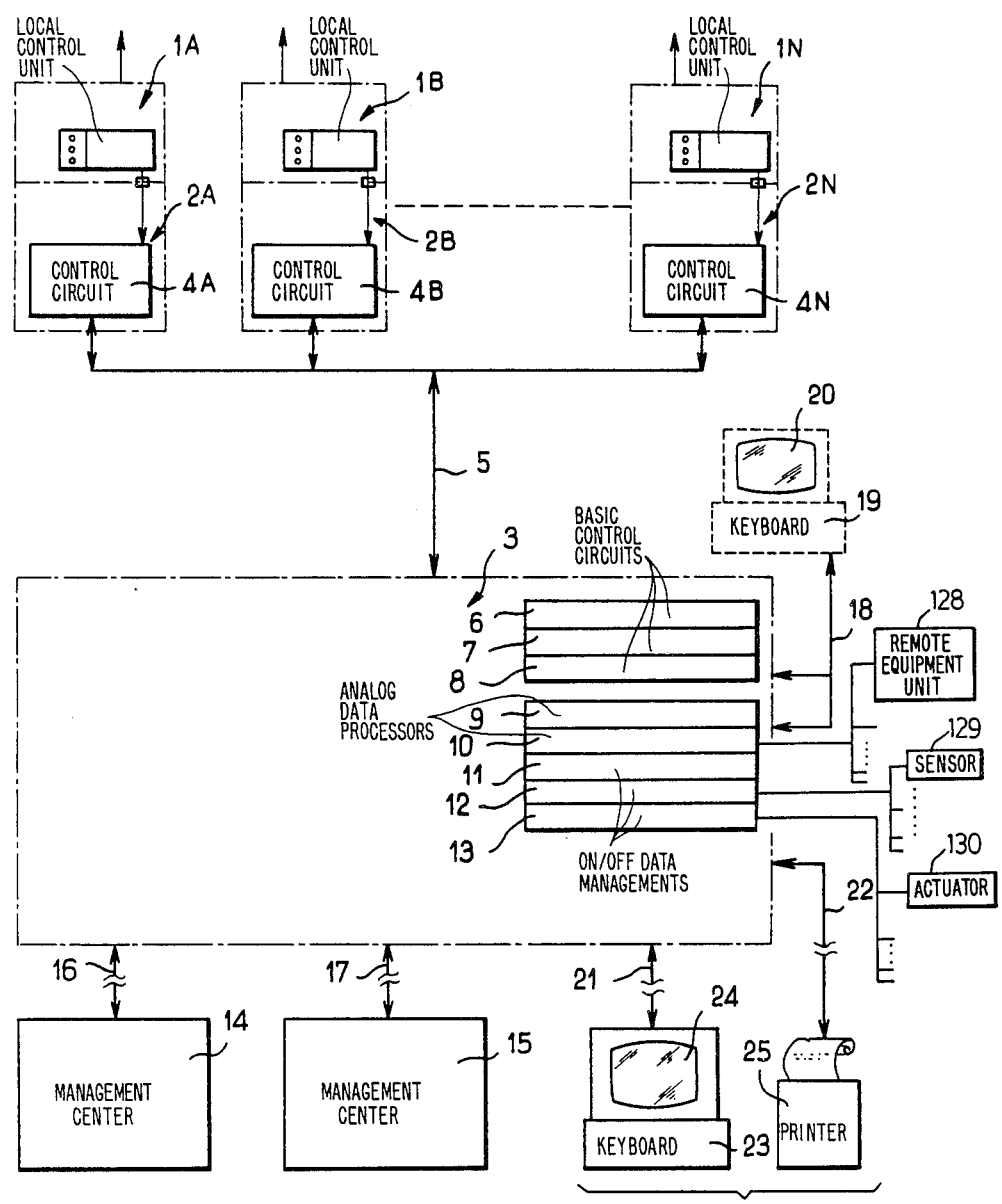
FIG. 1 is a general diagram of a device in accordance with the invention.

In the general diagram of FIG. 1, it is apparent that the electronic interface device for remote control and monitoring of a power distribution panelboard essentially comprises:

a plurality of local control units 1A, 1B . . . 1N corresponding to each outgoing power line of the panelboard, each of these local control units being connected to a remote control unit 2A, 2B . . . 2N; and a central unit 3 for each power distribution assembly of the panelboard. Each local control unit 1A, 1B . . . 1N comprises means which will hereinafter be described in detail for addressing "on/off" signaling and control data to the remote control unit 2A, 2B ... 2N.

Each remote control unit 2A, 2B ... 2N comprises a circuit 4A, 4B ... 4N which will hereinafter be described in detail and comprises a microprocessor for converting the on/off data delivered by the local control unit 1A, 1B ... 1N into data which are compatible with the central unit 3.

Each remote control unit 2A, 2B ... 2N is connected to the central unit 3 by means of a standardized link 5 of the series bus type designated as RS 422 comprising four conductors (two transmission conductors and two reception conductors).

The central unit 3 comprises different circuits 6, 7, 8, 9, 10, 11, 12, 13 which will be described in detail hereinafter and serve among other functions to exchange data between each remote control unit 2A, 2B ... 2N and one or a number of management centers 14, 15 by means of a standardized series link 16, 17 of the type RS 232 or 20 mA current loop having four conductors (two for transmission and two for reception).

In addition, the central unit 3 is connected by means of a standardized four-conductor link 18 to a remote diagnostic testing and maintenance equipment unit comprising a keyboard 19 and a display screen 20 enabling an operator to address data directly to the central unit 3.

The central unit 3 is also connected by means of a standardized series link 21, 22 of the type RS 232 to a keyboard 23 with display screen 24 and to a printer 25 for recording the states of the device and for introducing data.

Figure 2:
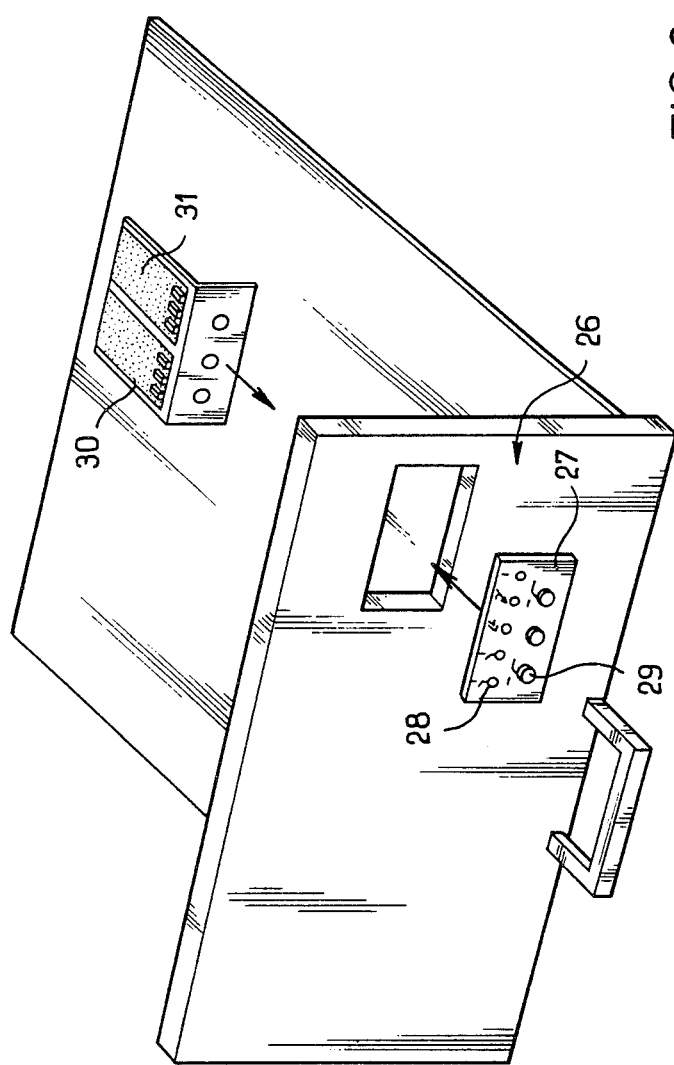
FIG. 2 is a perspective view of the drawer comprising the local control unit.

The local control unit such as the unit designated by the reference 1A will now be described in detail. Each local control unit is placed within a drawer 26 (shown in FIG. 2) which is movably mounted in the power distribution panelboard and designed as a plug-in unit.

The drawer 26 is provided with elements (not shown) such as circuit-breakers, fuses, contactors, protection or measurement relays, source inverters and like components which are adapted to cooperate with the electric power circuit of the panelboard.

The drawer 26 is provided on its front face with a control indicator 27 comprising electroluminescent diodes such as the diode 28 for indicating states such as plugged-in drawer, disconnected drawer, drawer under test, homopolar fault condition, drawer not available, and so on.

The control indicator 27 is also provided with push-buttons such as the push-button 29 for remote control. The control indicator 27 is connected to two local circuits 30, 31.

The local control unit comprises the following different electronic circuits:
 a basic local signaling circuit,
 an extension local signaling crcuit,
 a basic local signaling and control circuit,
 an extension local signaling and control circuit,
 a plurality of local control circuits numbered from 1 to 5.

These circuits make it possible by association and juxtaposition to analyze the power distribution elements of the panelboard, such as circuit-breakers, fuses, contactors, protection and measurement relays, source inverter, and so on.

The basic local signaling circuit 30 comprises three signals which are produced by electro-luminescent diodes and which are respectively green, red and yellow for indicating the following states: closing, opening, fault occurrence (malfunction). These three items of information (data) are transmitted to the output of the circuit which is connected to the remote control unit 2A.

The extension local signaling circuit 31 comprises three complementary signals produced by electroluminescent diodes for indicating complementary states such as drawer plugged-in, drawer disconnected, drawer under test, homopolar fault condition, drawer not available, and so on. These complementary signals can be combined with the states of the basic circuit 30.

Figure 3:
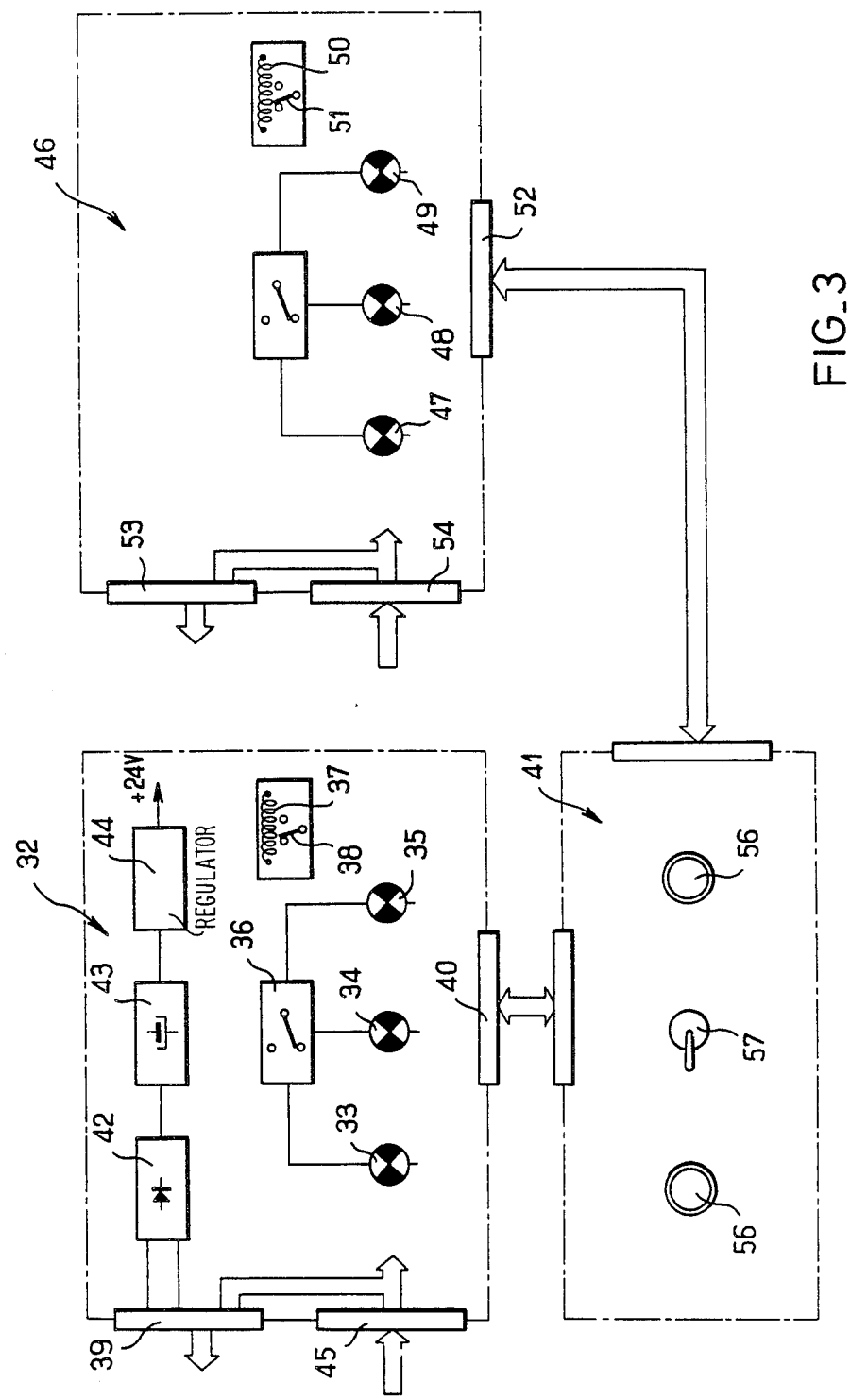
FIG. 3 is a diagram showing different circuits of the local control unit.

FIG. 3 shows diagrammatically the basic local signaling and control circuit 32. This circuit comprises three signals produced by electroluminescent diodes 33, 34, 35, a switch 36 for testing said diodes, a disconnectable or plug-in control relay 37 with an inverter 38, a connector 39 for establishing a link with the remote control unit 2A and a connector 40 for establishing a link with a circuit 41 which is one of the control circuits numbered from 1 to 5.

The output 39 of the circuit 32 is connected through a rectifier 42, a filter 43 and a regulator 44 to a 24-volt alternating-current supply 24.

The input 45 of the circuit 32 is connected to a wired logic system.

The circuit 32 addresses on/off signaling data to the remote control unit and receives an on/off control datum.

The extension signaling and control circuit 46 comprises three complementary signaling diodes 47, 48, 49, a complementary plug-in control relay 50 with inverter 51 and a connector 52 for establishing a link with one of the control circuits such as the circuit 41.

The output 53 of the circuit is connected to the remote control unit 2A and the input 54 is connected to the wired logic system.

The control circuits numbered from 1 to 5 such as the circuit 41 permit local control of the power equipment units of the panelboard by means of a push-button or connectors.

By way of example, the circuit 41 is intended to control the operation of a contactor and is provided for this purpose with an "ON" push-button 55, an "OFF" push-button 56 and a "local-remote" switch 57.

Figure 4:
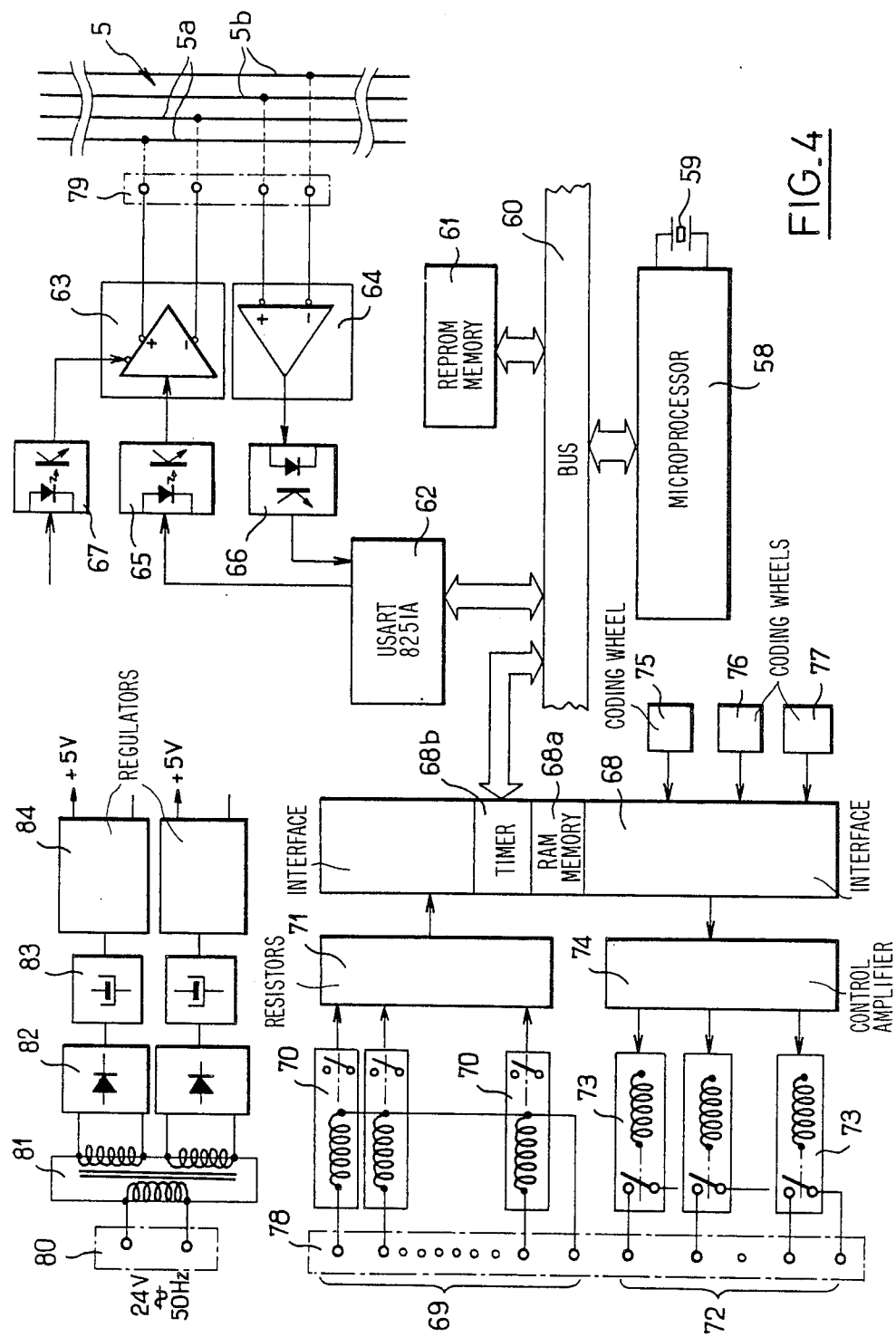
FIG. 4 is a diagram showing the different circuits of the remote control unit.

The remote control unit 2A will now be described in detail with reference to FIG. 4.

The remote control circuit 4A constitutes the interface between the local control unit 1A described in the foregoing and the central unit 3. The remote control circuit 4A serves to convert the on/off data supplied by the local signaling and control circuits into data which are compatible with the central unit 3 in the form of exchanges of eight-character messages on a four-conductor bus link 5 of the type RS 422 consisting of two transmission conductors 5a and two reception conductors 5b.

The remote control circuit essentially comprises a type-8085 microprocessor 58 connected to a quartz crystal 59 which oscillates at 6.144 MHz and the bus 60 of which is connected to a REPROM memory 61 of the type 2764 which has a capacity of 8K octets.

The microprocessor bus 60 is also connected to a component 62 of the type designated as USART 8251A, said component being connected to a differential transmitter 63 of the type designated as MC3487P and to a differential receiver 64 of the type MC3486P through photocouplers 65, 66. One of the inputs of the differential transmitter 63 is also connected to a photocoupler 67 which is independent of the microprocessor 58. The differential transmitter 63 is connected to the transmission conductors 5a of the RS 422 bus whilst the differential receiver 64 is connected to the reception conductor 5b of the bus.

The bus 60 of the microprocessor 58 is also connected to an interface 68 of the type PPI 8155 containing a RAM memory 68a and a timer 68b. The interface 68 is connected to the on/off inputs 69 by means of a series of REED-type 24-volt (dc) relays 70 through a resistor 71 for restoring to +5 volts. The interface 68 is connected to the on/off outputs 72 by means of a series of REED-type 5-volt (dc) relays 73 through a type-7417 control amplifier 74.

The interface 68 is also connected to two decimal coding wheels 75, 76 and to a hexadecimal coding wheel 77.

The on/off inputs 69 and the on/off outputs 72 are grouped together on a connector 78 which is connected to the local control unit 1A.

A second connector 79 serves to connect the remote control circuit to the bus 5 of the type RS 422.

A third connector 80 serves to connect the remote control circuit to a 24-volt alternating-current supply which is connected to a transformer 81, rectifiers 82, filters 83 and regulators 84 which serve to deliver a 5-volt direct-current supply to the microprocessor 58 and the RS 422 bus 5.

Figure 5:
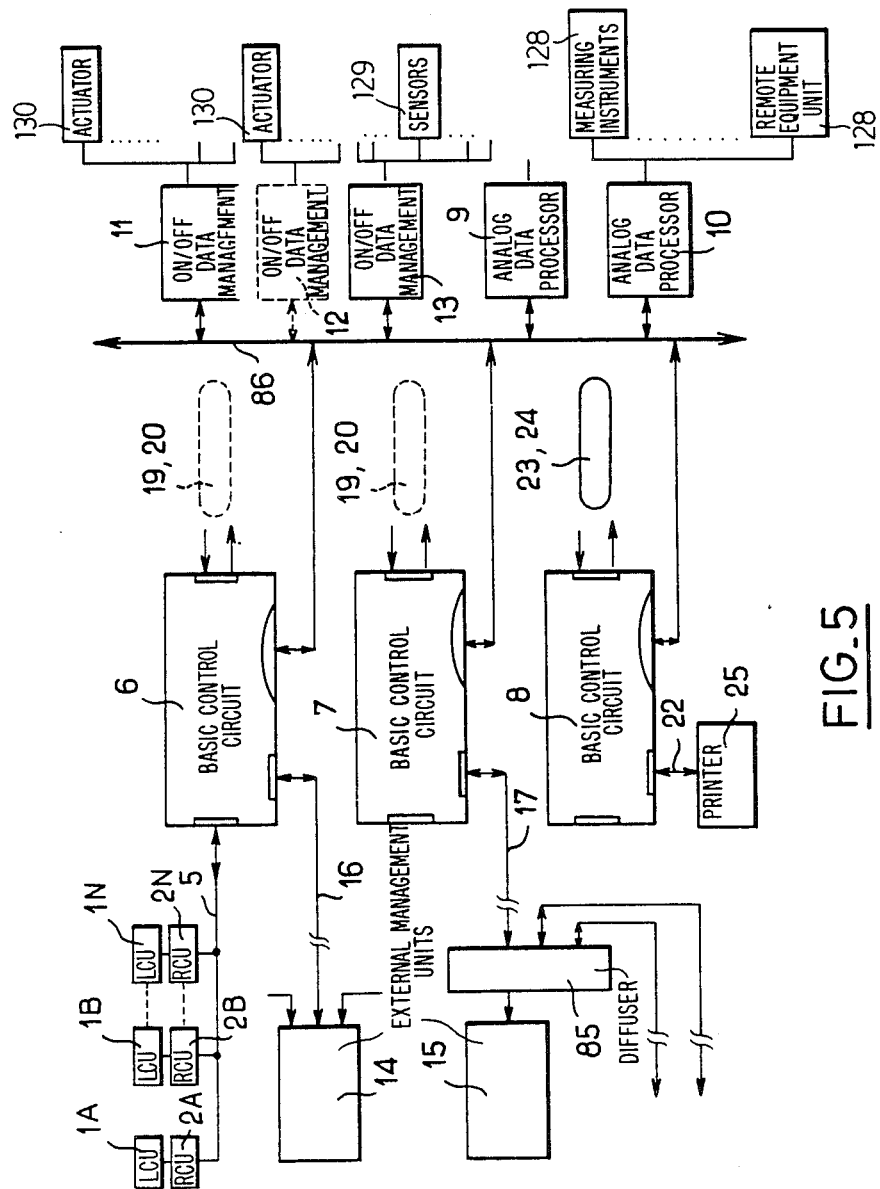
FIG. 5 is a diagram showing the different circuits of the central unit.

The central unit which is shown diagrammatically in FIG. 5 is incorporated in a disconnectable or pluggable drawer which is integrated in anoutgoing column of the distribution panelboard.

The local control units 1A, 1B ... 1N and the remote control units 2A, 2B ... 2N are connected to a basic control circuit 6 which serves to establish a dialog via the RS 422 bus 5 with the different remote control units 2A, 2B ... 2N. This basic control circuit 6 is coupled through a RS 232/V24 link or 0/20 mA ourrent loop 16 with a centralized external management unit 14. The basic control circuit 6 is also coupled with a remote diagnostic testing and maintenance equipment unit 19, 20 by means of a link of the type mentioned above.

The central unit comprises a second control circuit 7 which is identical with the basic circuit 6 and is coupled by means of a RS 232 bus or 0/20 mA loop 17 with another external management unit 15 such as a special process unit. This connection is established by means of a diffuser 85 which is connected to other systems (not shown in the drawings).

A third control circuit 8 which is identical in design with the circuits 6 and 7 serves to record the states in conjunction with a printer 25. One of the links of this circuit is connected to a keyboard 23 comprising a display screen 24 in order to permit time-setting and editing of predetermined functions or events.

The three control circuits 6, 7, 8 are connected through a parallel bus 86 to circuits 9, 10, 11, 12, 13.

The circuit 9 which comprises eight analog inputs serves to process analog data 0.4/20 mA in order to measure values of power, current intensity, frequency, power factor and so on.

The circuit 10 comprises eight analog outputs and serves to transmit analog data to remote equipment units 128 which are compatible at 0.4/20 mA such as voltmeters, ammeters, frequency meters.

The three circuits 11, 12, 13 which are identical with each other serve to manage on/off data. Each circuit 11, 12, 13 aforesaid has eight on/off inputs, eight on/off outputs and eight on/off inputs/outputs, connected to external sensors 129 or actuators 130.

Figure 6:
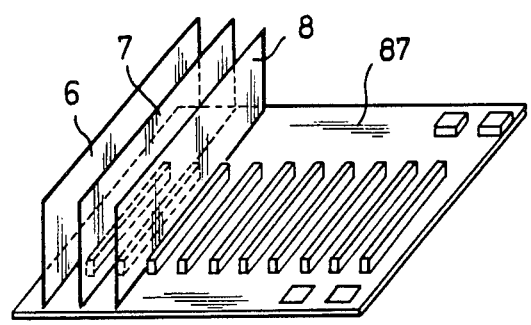
FIG. 6 shows the parent card which supports the different cards on which the different circuits of the central unit are printed.

The circuits 6, 7, 8, 9 ... 13 are designed in the form of cards which are plugged into a parent card 87 (as shown in FIG. 6) which carries the parallel bus 86.

Figure 7:
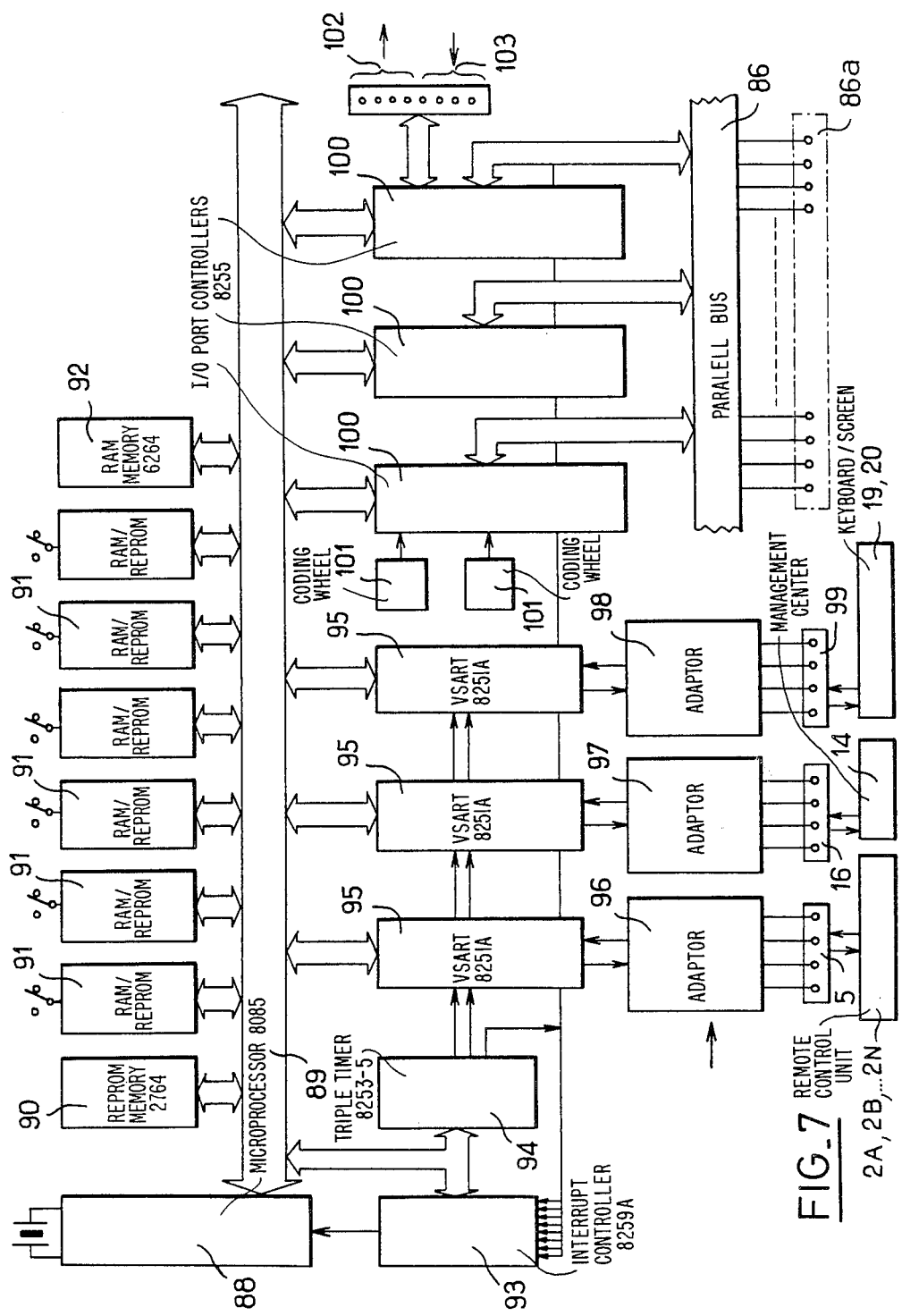
FIG. 7 is a diagram of the basic control circuit of the central unit as well as of the circuits for a complementary management and state-recording unit.

FIG. 7 is a diagram of the basic control circuit 6. This circuit comprises a microprocessor 88 of the type 8085, the bus 89 of which is connected to an 8K-octets(8-kilobyte) REPROM memory 90 of the type 2764, to a series of RAM/REPROM memories 91 of the type 2764/6264 which can be switched either to the RAM operating mode or to the REPROM mode and to a 8K-octets (8-kilobyte) RAM memory 92 of the type designated as 6264.

The microprocessor 88 is also connected to an IT controller 93 of the type designated as 8259 A. This controller is in turn connected to the brs 89 and to a triple timer 94 (of the type 8253-5), then to three components 95 of the type designated as USART 8251A. The components are in turn connected to the bus 89 and to components 96, 97, 98 for matching with the connections established with the RS 422 bus 5 (remote control unit), with the RS 232 bus or 20 mA loop 16 (centralized management) and with the link 99 which is connected to the keyboard 19 and the maintenance screen 20.

The bus 89 of the microprocessor 88 is also connected to the parallel bus 86 which is connected to the circuits 9, 10, 11, 12, 13 at 86a by means of three components 100 of the type 8255. The first of these components 100 is connected to two decimal coding wheels 101 whilst the third component is connected to four on/off outputs 102 and to four on/off inputs 103.

Figure 8:
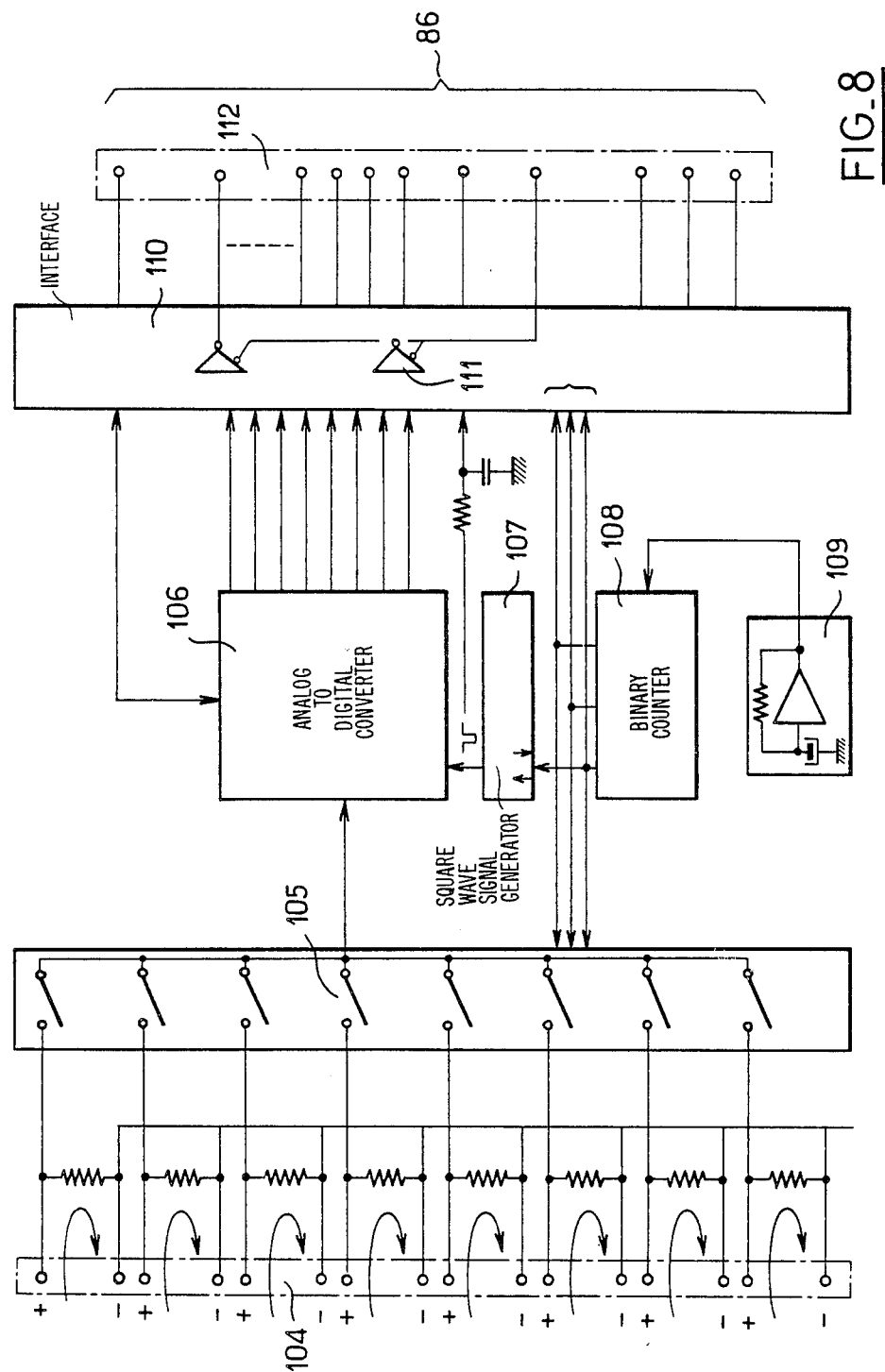
FIG. 8 is a diagram of the analog input circuit of the central unit.

FIG. 8 is a schematic illustration of the circuit 9 having eight analog inputs grouped together on a connector 104 which serves to process analog data at 0.4/20 mA in order to measure values of power, current intensity, frequency, Power factor andso on. Each of these inputs is connected to an analog switch such as the switch 105. These switches are in turn connected to an analog-to-digital converter 106 which is in turn connected to a square-wave signal generator 107, a binary counter 108 and an asynchronous internal oscillator 109.

The analog converter 106 is connected to an interface 110 comprising three-state gates and amplifiers 111. The interface 110 is connected through a connector 112 to the parallel bus 86 which is connected to the basic circuits 6, 7, 8.

Figure 9:
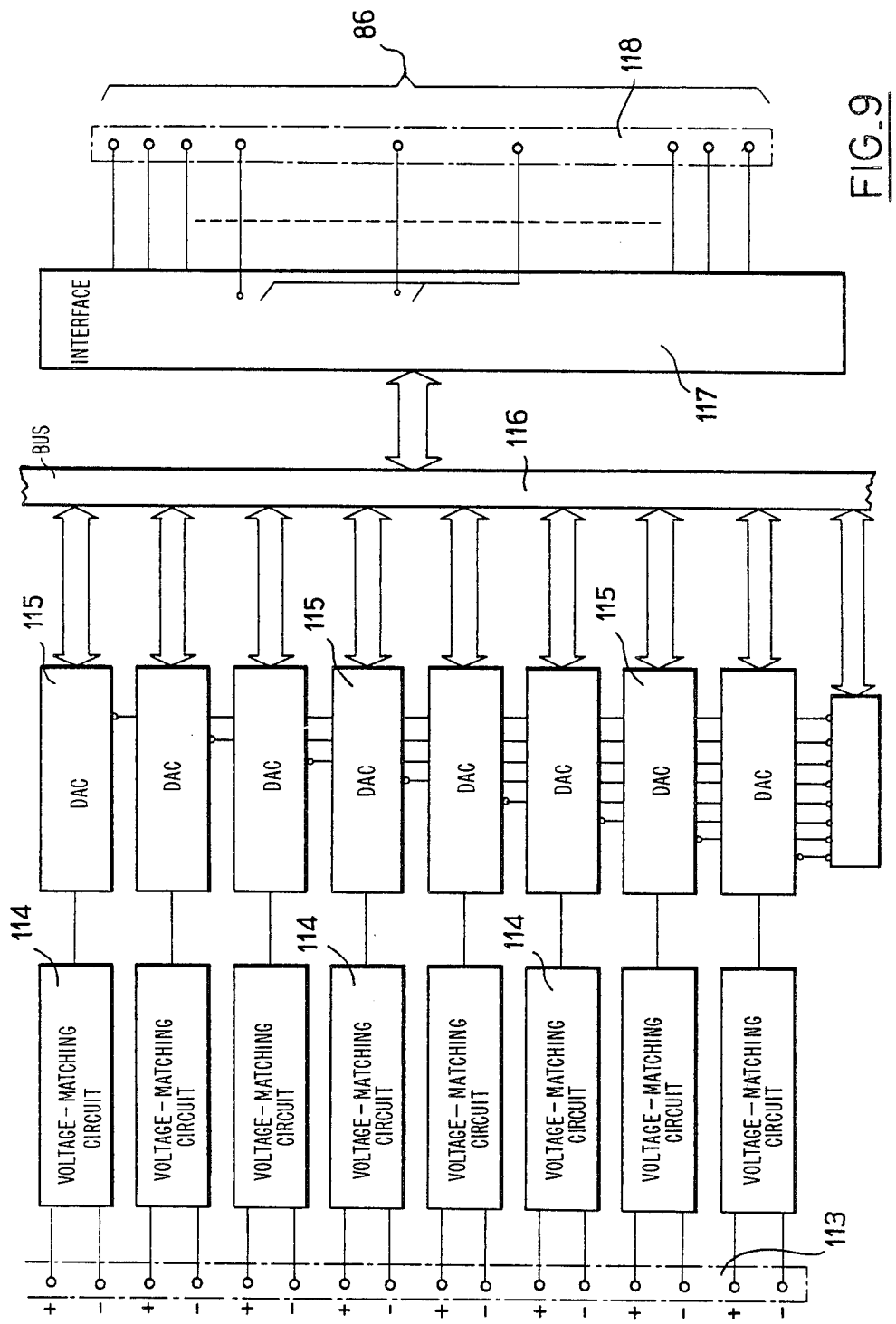
FIG. 9 is a diagram of the analog output circuit of the central unit.

FIG. 9 is a schematic representation of the circuit 10 having eight analog outputs grouped together on a connector 113. The function of this circuit is to deliver analog data to remote equipment units 128 which are compatible at 0.4/20 mA such as voltmeters, ammeters, frequency meters, and so on. Each of these outputs is connected to a voltage-matching component such as the component 114 which is in turn connected to a digital-to-analog converter 115.

Each converter 115 is connected through a bus 116 to an interface 117 which is similar to the interface 110 of the circuit 9. The interface 117 is connected through a connector 118 to the parallel bus 86 which is in turn connected to the basic circuits 6, 7, 8.

FIG. 10 is a diagram showing the arrangement of one of the circuits 11, 12, 13 which serve to manage on/off data.

This circuit comprises eight on/off inputs 119, eight on/off outputs 120 and eight on/off inputs/outputs 121 which are all connected to the parallel bus 86 through a connector 121a. The inputs 119 are connected through a storage circuit 122 comprising D-type flip-flops to an external matching circuit 123 comprising a relay, a power transistor or a photocoupler.

The outputs 120 are connected through an RC filter circuit 124 to an external matching circuit 125.

The inputs/outputs 121 are connected to a D-type flip-flop storage circuit or RC filter circuit 126 which is in turn connected to an external matching circuit 127.

It is apparent from the foregoing description of one example of construction of the device in accordance with the invention that the processing power and operational reliability of the device as well as the simplification achieved both in regard to wiring and cable connections and in regard to practical utilization of the device make it possible to manage a power distribution assembly comprising twelve hundred remote signaling units, four hundred remote control units, eight "input" analog telemetering units, eight "output" analog telemetering units and seventy-two on/off inputs/outputs. All of these data are transmitted in the form of eight-character messages on a standardized bidirectional link comprising two transmission conductors and two reception conductors.

Although the device which has just been described is more particularly intended to manage low-voltage power distribution panelboards of the plug-in type, this device could also equip assemblies such as those mentioned below:

high-voltage distribution assemblies comprising equipment units either of the fixed type or of the plug-in or so-called draw-out type;

low-voltage distribution assemblies comprising either fixed or disconnectable equipment units;

units which already exist and have to be made compatible with new equipment.

The device in accordance with the invention also offers the advantage of modularity, that is to say of permitting different modes of assembly or arrangement according to the requirements of users.

Thus the central unit 3 could be simplified by eliminating the basic control circuits 7 and 8 and by reducing the number of circuits 11 to 13. Similarly, the number of inputs and outputs of the circuits 9 and 10 could be reduced.

This adaptation or modification of the central unit can readily be achieved by disconnecting predetermined circuits in the form of cards from the parent card 87.

In like manner, the remote control unit 2A, 2B ... 2N could be simplified by reducing the number of inputs and outputs.

Moreover, the local control unit 1A, 1B ... 1N could be simplified by reducing the number of control circuits such as the circuit 41.

We claim:

1. Electronic interface device for remote control and monitoring of a power distribution panelboard connected to a management system (14), said panelboard comprising a plurality of power distribution assemblies each having a plurality of outgoing power lines, said device comprising:

for each outgoing power line, a local control unit 1A, 1B ... 1N) connected to a remote control unit (2A, 2B ... 2N), for each distribution assembly, a central unit (3), each local control unit (1A, 1B ... 1N) comprising means for addressing on/off signaling and control data to the remote control unit (2A, 2B ... 2N), each remote control unit (2A, 2B ... 2N) comprising a microprocessor (58) for converting the on/off signaling and control data supplied by each local control unit (1A, 1B ... 2N, into data which are compatible with the central unit (3), said microprocessor being connected by means of a bus (60) to a REPROM memory (61) and to a transmitter (63) and a differential receiver (64) which are connected by means of: a standardized four-conductor series link (5) to the central unit, to an interface (68) comprising a RAM memory (68a) and a timer (68b), to on/off inputs and outputs (69, 72) which comprise decimal coding wheels (75, 76) and a hexadecimal coding wheel (77), a signal amplifier (74) and decoupling relays (70, 73), said remote control units being connected to a low-voltage supply (80 to 84), said central unit (3) having at least one basic control circuit (6) comprising a microprocessor for data exchange between each remote control unit (2A, 2B ... 2N) and said management sytem (14) by means of a standarized four-conductor series link or current loop (16).

2. Device in accordance with claim 1, and a basic control circuit connected by means of a standardized four-conductor link (18) to a remote diagnostic testing and maintenance equipment unit (19, 20) for directly addressing data to said control circuit.

3. Device in accordance with claim 1, said central unit (3) comprising a basic control circuit (7) connected by means of a standarized four-conductor series link (17) to a second management unit (15).

4. Device in accordance with claim 1, said central unit (3) comprising a basic control circuit (8) connected by means of a standarized four-conductor link (21, 22) to a printer (25) and to a keyboard (23) with display screen (24) for recording and introducing data.

5. Device in accordance with claim 1, in which said central unit (3) further comprises a circuit (9) having analog inputs connected to said microprocessor of said basic control circuits (6, 7, 8) for measuring parameters such as power, current intensity and frequency, and a circuit (10) having analog outputs for transmitting the parameters aforesaid to remote equipment units such as measuring instruments (128).

6. Device in accordance with claim 1, in which said central unit (3) further comprises circuits (11, 12, 13) for managing with respect to each other the signaling and control on/off data processed by the central unit (3), each of these circuits comprising a plurality of on/off inputs and outputs connected to external sensors (129) or actuators (130).

7. Device in accordance with claim 1, in which each local control unit (1A, 1B ... 1N) comprises a basic local signaling circuit (30), an extension local signaling circuit (31), a basic local signaling and control circuit (32), an extension local signaling and control circuit (46) and local signaling-control circuits for local control of the power equipment of said distribution panelboard in conjunction with said circuits.

8. Device in accordance with claim 7, in which said local control unit (1A, 1B ... 1N) is disposed within a drawer (26) pluggably mounted in the panelboard.

* * * * *